Nov. 12, 1929.  C. J. ANDERSON  1,735,594

CUTTER

Filed Jan. 13, 1928

Inventor
Carl J. Anderson.
By Chindahl Parker Carlson
Attys.

Patented Nov. 12, 1929

1,735,594

UNITED STATES PATENT OFFICE

CARL J. ANDERSON, OF CHICAGO, ILLINOIS, ASSIGNOR OF FIFTY-ONE AND TWO-THIRDS PER CENT TO ERIK BORG AND FIFTEEN PER CENT TO CARL U. JOHANSON, BOTH OF CHICAGO, ILLINOIS

CUTTER

Application filed January 13, 1928. Serial No. 246,483.

The invention relates generally to cutters and more particularly to high speed power driven cutters which are especially adapted for cutting wood across the grain to produce a smooth, uniform surface thereon. Such a cutter may be used to advantage in resurfacing butchers' blocks, clickers' blocks or the like which has become uneven or discolored. When rigid dies are used to cut shapes of material upon a clicker's block, the surface of the block must be uniform and smooth to avoid distortion or breaking of the dies. It is well known that such blocks, especially clickers' blocks, are usually made from extremely hard and tough wood and since the business houses or plants which would ordinarily use such a cutter are not equipped to sharpen the cutter, it must be of such a character that its cutting edges will withstand a maximum amount of use. The primary object, therefore, of the present invention is to provide a novel cutter embodying means operable to prolong the life of the cutting edges thereof.

Another object is to provide a cutter adapted to be driven at high speeds and embodying resilient connecting means interposed between the driving means and the cutter teeth.

Other objects and advantages will become apparent from the following description and from the drawings in which.

Figure 1:
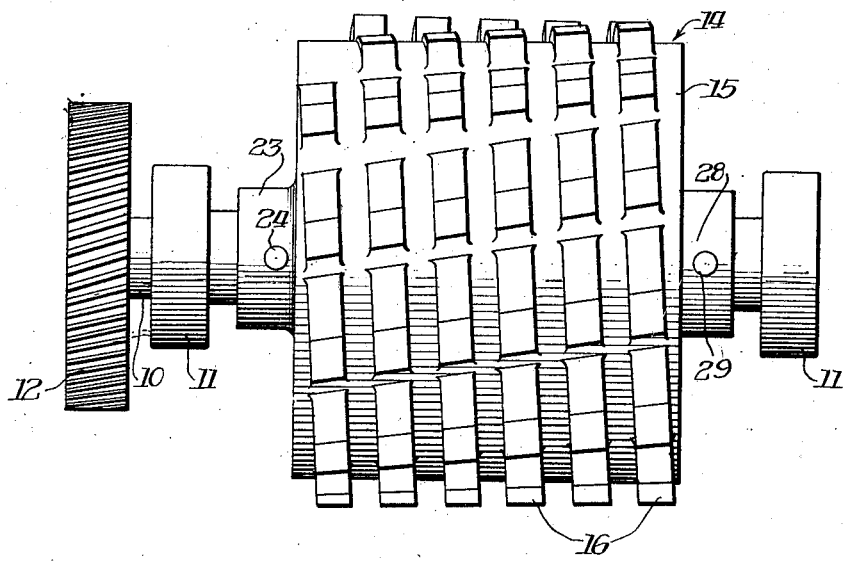
Figure 1 is a side view of a cutter embodying the preferred form of the invention.
Figure 2:
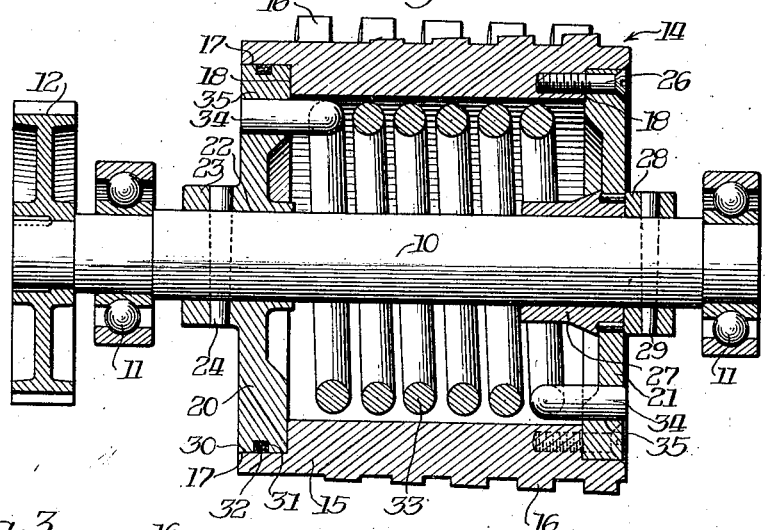
Fig. 2 is a longitudinal central sectional view of the cutter shown in Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawings I have illustrated a cutter assembly which embodies the present invention and which is especially adapted for use in connection with a cutter housing and driving means such as that disclosed in Patent No. 1,608,920 issued to me on the 30th day of November, 1926. A shaft 10 is provided which may be mounted in suitable supporting members (not shown) by means of a plurality of ball bearings 11 placed at spaced intervals thereon. A gear 12 keyed to one end of the shaft 10 is adapted to mesh with a suitable driving gear (not shown).

Figure 3:
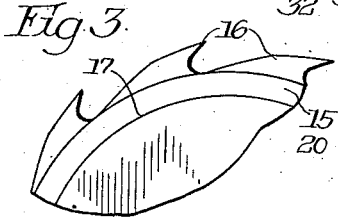
Fig. 3 is a fragmental end elevation of the cutter.

Cutting means is provided mounted on the shaft 10 for rotation about the axes thereof. The cutting means herein shown comprises a cylindrical member or cutter generally designated as 14. The cutter 14 consists of a cylindrical wall 15 having a plurality of cutting teeth 16 formed in a spiral arrangement on the outer surface of the wall. It has been found that for making relatively shallow cross grain cuts upon hard wood, the particular type of hook-shaped tooth shown in Fig. 3 will produce a much better cut surface than can be obtained by the use of ordinary teeth having straight faces. The inner corner of the wall 15 is annularly recessed at each end to form an annular surface 17 concentric with the axis of the cylinder, and a shoulder 18 facing outwardly of the cylinder.

Means for supporting the cylindrical cutting member 14 on the shaft 10 for rotation about the axis thereof comprises, in the present instance, a pair of circular end plates or walls 20 and 21 which are arranged to fit within the annular surface 17 and against the shoulders 18. The end wall 20 has a central aperture 22 and an integral hub portion 23 to receive the shaft 10 and is fixed to the shaft for rotation therewith by a tapered pin 24 which extends through suitable apertures formed in the hub and shaft.

The other end wall 21 is fixed in position against the other of the shoulders 18 by means such as screws 26 which pass through suitable apertures formed in the wall and engage the cylindrical wall 15 of the cutter. The end wall 21 is rotatably mounted on the shaft 10 and is preferably provided with a hub or bearing sleeve 27 centrally secured to the end wall. In order to maintain the cutter 14 in assembled position relative to the end wall 20, holding means is provided which may be attached to the shaft abutting the outer side of the wall 21. In the present instance this means is in the form of a collar 28 arranged to slide onto the shaft into abutment with the outer side of the end wall 21 and to be held in such position by a taper pin 29 passing through the collar and shaft.

The invention contemplates a slight rotative movement of the cutter cylinder 14 relative to the end member 20, the outer peripheral surface 30 of the end member sliding upon the surface 17 of the cylinder, and to prevent the passage of dust between these surfaces and to assist in the lubrication thereof an annular groove 31 is formed in the surface 30 and packing 32 placed therein.

Resilient means is provided interposed between the shaft 10 and cutter cylinder 14 for transmitting the motion of the shaft to the cylinder. As herein shown this means comprises a coiled torsion spring 33 which is preferably positioned within the cutter cylinder substantially concentric therewith and having its opposite ends connected to the two end walls 20 and 21 respectively. The ends 34 of the spring 33 are herein shown bent to an axial position so as to extend into bores 35 formed in the end walls.

The invention contemplates the replacement of the cutter cylinder by persons who are relatively unskilled mechanically by the use of ordinary tools and the construction herein shown is especially adaptable to such conditions since the taper pin 29 may be easily removed to loosen the collar 28, whereupon the end wall 21 and the cutter cylinder 14 may be removed from the shaft. The end wall 21 may then be removed from the cutter cylinder 14 by removing screws 26 so that the wall may be fastened to another cylinder for reassembly.

When the cutter is in use and happens to encounter exceptionally tough fiber or other obstruction it will not be positively driven against such obstruction so as to dull the particular cutting tooth 16 in contact therewith, but will be permitted to give slightly by reason of the spring 33 interposed between the driving shaft and the cutter tooth. Thus the cutting of the obstruction may take place more slowly so as to reduce the dulling effect upon the tooth.

From the foregoing description it will be apparent that the invention provides a cutter which is especially adapted for cross grain cutting of butchers' blocks and the like.

It will also be apparent that the provision of a resilient connection between the driving means and the cutting teeth tends to prolong the life of the sharpened edges thereof.

I claim as my invention:

1. A cutter assembly comprising, in combination, a rotatable shaft; a cylindrical cutter adapted to be supported upon said shaft concentrically therewith; means for rotatably supporting said cutter on said shaft comprising a circular end plate concentrically fixed upon said shaft in a plane perpendicular thereto for rotation therewith, a second end plate removably secured to one end of said cutter and having a central bearing adapted to be fitted rotatably upon said shaft, the free end of said cylindrical cutter being fitted rotatably on said first mentioned end plate, and means for securing said cutter and end plates in assembled relation; and resilient means interposed between said shaft and said cutter for transmitting motion thereto, said means comprising a coiled torsion spring mounted within said cutter cylinder and having its ends engaging opposite end plates.

2. A cutter comprising a shaft, a cylindrical member concentrically and rotatably supported relatively to said shaft, a plurality of cutter teeth formed on the outer surface of said member, and a coiled torsion spring concentric with and interposed between said shaft and said cylindrical member, said spring having its opposite ends operatively connected to said shaft and said member respectively.

In testimony whereof, I have hereunto affixed my signature.

CARL J. ANDERSON.